US011417117B2

(12) United States Patent
Bayer et al.

(10) Patent No.: US 11,417,117 B2
(45) Date of Patent: Aug. 16, 2022

(54) METHOD AND DEVICE FOR DETECTING LANES, DRIVER ASSISTANCE SYSTEM AND VEHICLE

(71) Applicant: Continental Teves AG & Co. OHG, Frankfurt am Main (DE)

(72) Inventors: Christopher Bayer, Taufkirchen (DE); Claudio Heller, Munich (DE); Claudia Loy, Munich (DE); Alexey Abramov, Munich (DE)

(73) Assignee: CONTINENTAL TEVES AG & CO. OHG, Frankfurt am Main (DE)

( * ) Notice: Subject to any disclaimer, the term of this patent is extended or adjusted under 35 U.S.C. 154(b) by 173 days.

(21) Appl. No.: 16/643,973

(22) PCT Filed: Aug. 31, 2018

(86) PCT No.: PCT/DE2018/200078
§ 371 (c)(1),
(2) Date: Mar. 3, 2020

(87) PCT Pub. No.: WO2019/057252
PCT Pub. Date: Mar. 28, 2019

(65) Prior Publication Data
US 2020/0410256 A1 Dec. 31, 2020

(30) Foreign Application Priority Data
Sep. 22, 2017 (DE) .................... 10 2017 216 802.1

(51) Int. Cl.
*G06K 9/00* (2022.01)
*G06V 20/56* (2022.01)
(Continued)

(52) U.S. Cl.
CPC ............. *G06V 20/588* (2022.01); *G06N 3/08* (2013.01); *G06T 7/13* (2017.01); *G06T 7/73* (2017.01);
(Continued)

(58) Field of Classification Search
CPC ............. G06K 9/00798; G06K 9/4609; G06K 9/4604; G06K 9/4628; G06N 3/08;
(Continued)

(56) References Cited

U.S. PATENT DOCUMENTS 7,046,822 B1   5/2006   Knoeppel et al.
8,452,053 B2   5/2013   Zhang et al.
(Continued)

FOREIGN PATENT DOCUMENTS

DE       101 27 034        12/2002
DE       102009048892      12/2010
(Continued)

OTHER PUBLICATIONS

English translation of the International Search Report of the International Searching Authority for International Application PCT/DE2018/200078, dated Nov. 26, 2018, 2 pages, European Patent Office, HV Rijswijk, Netherlands.
(Continued)

*Primary Examiner* — Charlotte M Baker
(74) *Attorney, Agent, or Firm* — RatnerPrestia

(57) ABSTRACT

A method of detecting lanes includes the steps: capturing (S1) a camera image (K) of a vehicle environment by a camera device (2) of a vehicle (5); determining (S2) feature points (P1 to P15) in the camera image (K), which feature points correspond to regions of possible lane boundaries (M1, M2); generating (S3) image portions of the captured camera image (K) respectively around the feature points (P1 to P15); analyzing (S4) the image portions using a neural
(Continued)

network to classify the feature points (P1 to P15); and determining (S5) lanes in the vehicle environment taking account of the classified feature points (P1 to P15).

20 Claims, 3 Drawing Sheets

(51) Int. Cl.
    *G06T 7/73*     (2017.01)
    *G06T 7/13*     (2017.01)
    *G06N 3/08*     (2006.01)
    *G06V 10/44*     (2022.01)

(52) U.S. Cl.
    CPC .. *G06V 10/443* (2022.01); *G06T 2207/20024* (2013.01); *G06T 2207/20084* (2013.01); *G06T 2207/30256* (2013.01)

(58) Field of Classification Search
    CPC ... G06T 7/13; G06T 7/73; G06T 2207/20024; G06T 2207/20084; G06T 2207/30256; G06V 20/588; G06V 10/443; G06V 10/44; G06V 10/454
    USPC .......................... 382/104; 348/119, 113, 114
    See application file for complete search history.

(56) References Cited

U.S. PATENT DOCUMENTS

| | | |
|---|---|---|
| 8,670,592 B2 | 3/2014 | Zhang |
| 8,773,535 B2 | 7/2014 | Zhang |
| 10,124,730 B2 | 11/2018 | Nariyambut Murali et al. |
| 2017/0300059 A1* | 10/2017 | Rust ........................ G01S 7/003 |
| 2018/0173970 A1 | 6/2018 | Bayer et al. |
| 2018/0188059 A1* | 7/2018 | Wheeler ............ G01C 21/3635 |
| 2019/0041038 A1* | 2/2019 | White .................... B60Q 1/143 |

FOREIGN PATENT DOCUMENTS

| | | |
|---|---|---|
| DE | 102011055458 | 6/2012 |
| DE | 102011111856 | 2/2013 |
| DE | 102011122310 | 6/2015 |
| DE | 102015209467 | 11/2016 |
| DE | 102017105661 | 9/2017 |
| EP | 2 549 408 | 1/2013 |
| EP | 3 171 292 | 5/2017 |
| WO | WO 00/77736 | 12/2000 |

OTHER PUBLICATIONS

PCT International Preliminary Report on Patentability including English Translation of PCT Written Opinion of the International Searching Authority for International Application PCT/DE2018/200078, dated Mar. 24, 2020, 6 pages, International Bureau of WIPO, Geneva, Switzerland.

German Search Report for German Patent Application No. 10 2017 216 802.1, dated Aug. 2, 2018, 8 pages, German Patent and Trademark Office, Muenchen, Germany, with partial English translation, 6 pages.

* cited by examiner

METHOD AND DEVICE FOR DETECTING LANES, DRIVER ASSISTANCE SYSTEM AND VEHICLE

FIELD OF THE INVENTION

The invention relates to a method for detecting lanes, a device for detecting lanes, a driver assistance system, and a vehicle.

BACKGROUND INFORMATION

Driver assistance systems produce a model of the vehicle surroundings based on a plurality of sensor data. In addition to detecting obstacles and further road users, the detection of lanes is particularly relevant. By establishing the vehicle's movement in the lanes, the driver can be given an early warning in the event of the vehicle unintentionally leaving a lane. Driver assistance systems can additionally support the driver with remaining in a particular lane or can steer the vehicle autonomously along the lane.

The lanes are usually detected by establishing the lane boundaries, a term used in particular to denote lane markings and curbsides. The printed publication DE 10 2015 209467 A1 discloses a method of estimating lanes using feature vectors which are established independently of each other based on various sensors.

Since the mostly white or yellow lane markings stand out from the dark road, edge detection methods which capture the transition between the lighter and darker areas can be deployed in order to establish the lane markings. The use of Sobel filters is widespread, wherein a difference in the brightness values of two neighboring areas is substantially calculated. At a constant brightness, this difference is averaged at zero, while values which differ from zero are produced at the edges.

The deployment of neural networks for detecting objects and, in particular, for detecting lane markings is becoming increasingly widespread. The advantage of such methods is that different surrounding conditions, for instance variations in the brightness relating to the time of day or weather, can be taken better account of than is the case for static Sobel filters.

However, since detected images are typically evaluated by means of neural networks pixel by pixel, the computational cost is relatively high, resulting in an increased energy consumption and a reduced evaluation speed.

SUMMARY OF THE INVENTION

It is therefore an object of the present invention to make possible a rapid and precise detection of lanes.

This object can be achieved by a method, a device, a driver assistance system, and a vehicle respectively having the features of respective aspects of the invention as set forth herein.

According to a first aspect, the present invention accordingly creates a method for detecting lanes, wherein a camera image of an environment of a vehicle is captured by means of a camera device of the vehicle. Feature points which correspond to regions of possible lane boundaries are determined. Image portions of the captured camera image are generated around each feature point. The image portion is analyzed using a neural network in order to classify the feature points. Finally, lanes in the vehicle environment are detected, taking account of the classified feature points.

According to a second aspect, the present invention accordingly creates a device for detecting lanes, which has an interface for receiving a camera image of an environment of the vehicle captured by means of a camera device of a vehicle. The device additionally comprises a computing apparatus which determines feature points in the camera image received by means of the interface, which feature points correspond to regions of possible lane boundaries. The computing apparatus generates image portions of the captured camera image around a feature point, analyzes the image portions using a neural network in order to classify the feature points and determines lanes in the vehicle environment taking account of the classified feature points.

According to a third aspect, the invention relates to a driver assistance system for a vehicle, comprising a camera device which captures a camera image of an environment of the vehicle, and comprising a device for detecting lanes on the basis of the camera image captured by the camera device.

According to a fourth aspect, the invention relates to a vehicle comprising a driver assistance system.

The invention provides a two-stage detection of lanes. During a first stage, the camera image is analyzed by means of preferably traditional methods for detecting features and feature points are determined, which correspond to regions of possible lane boundaries. During this first step, less relevant regions, i.e. those regions in which in all probability no lane boundaries are to be expected, are already eliminated in a coarse evaluation. This reduces the computational cost during the further processing of the data.

In a subsequent second stage, a more detailed analysis of the discovered feature points is performed. To this end, image portions around the feature points are evaluated by means of a neural network. As a result, a classification of the feature points can be performed, i.e. a categorization of whether the feature point corresponds to a lane boundary or not. The lanes are determined on the basis of those feature points which have been classified as feature points corresponding to lane boundaries.

A further advantage of neural networks compared with Sobel filters is the consideration of larger image portions. Thus, a Sobel filter has in general a capturing range of, for instance, 3×3 pixels, while the image portion for the neural network can have, for example, a capturing range of 128× 128 pixels. These larger image portions make it possible for the neural network to capture the context of the surroundings in order to classify the feature point. Thus, for example, bushes within the image portion can indicate a guardrail and, therefore, a misidentification or an outlier. Consequently, a surrounding region of the image portion is also advantageously evaluated.

The invention consequently preferably combines traditional methods with the use of neural networks. However, due to the pre-filtering, only specific regions of the camera image have to be analyzed by means of the neural network and a total evaluation of all of the pixels can be dispensed with. As a result, the lane detection can be performed quickly and efficiently. At the same time, the high detection accuracies of the neural networks can be fully utilized.

In order to prevent lane boundaries not being detected, the thresholds which have to be exceeded in order to detect a pixel as a feature point are preferably set relatively low. The resulting false identifications are subsequently filtered out again by means of the neural network. If Sobel filters are exclusively used, the thresholds are typically selected in such a way that as few misidentifications as possible occur. As a result, low-contrast lane boundaries are not detected however. Thanks to the two-stage method according to the invention, no such compromise has to be made and the detection accuracy is higher.

According to a preferred further development of the method, the feature points are determined using edge detection algorithms. The edge detection is consequently effected by means of traditional methods and preferably by using Sobel filters.

According to a preferred further development of the method, the possible lane boundaries comprise lane markings. In particular, lane markings can be exclusively detected as possible lane boundaries. Lane markings or road markings are to be construed to be colored markers on the surface of the roads, which divide or delimit the individual lanes. According to further embodiments, the lane boundaries can however also comprise curbsides, guardrails or vegetation, in particular if road markings are missing.

According to a preferred further development of the method, the neural network is a convolutional neural network.

According to a preferred further development of the method, the neural network is taught by means of predefined training data from a database.

According to a further development, the training data comprise illustrations of lane boundaries. The training data can additionally comprise illustrations of structures which do not constitute lane markings. These illustrations are preferably selected in such a way that they illustrate structures and objects which can typically be wrongly identified as lane markings by means of traditional edge detection. Examples can be illustrations of vehicles or of guardrails which do not constitute a lane boundary. As a result, the neural network is taught in such a way that illustrations of lane boundaries are distinguished from illustrations which do not show lane boundaries.

The image portions used for analysis by means of the neural network preferably have a predefined number of pixels or a predefined size. The illustrations selected as training data preferably correspond to typical illustrations of images of the vehicle environment of said predefined number of pixels or size captured by means of a camera device of a vehicle.

The illustrations are preferably at least partially generated with different brightnesses. For example, the illustrations can be generated at various times of day. The illustrations can also be generated under various lighting conditions, for instance on poorly lit or well-lit streets. The illustrations can additionally be captured in various weather conditions, for instance sunshine, fog, rain or snow.

According to a preferred further development of the method, the courses of lane boundaries are determined in that neighboring feature points which have been classified as belonging to a lane boundary are interpolated. On the basis of the courses of the lane boundaries, the lanes which are usable by the vehicle are established.

According to a preferred further development of the device, the computing apparatus determines the feature points using edge detection algorithms.

According to a preferred further development of the device, the computing apparatus uses Sobel filters in order to detect edges.

According to a preferred further development, the computing apparatus of the device is configured to determine courses of lane boundaries by interpolating neighboring feature points which have been classified accordingly as a lane boundary. The computing apparatus establishes the lanes which are usable by the vehicle on the basis of the courses of the lane boundaries.

BRIEF DESCRIPTION OF THE DRAWINGS

The present invention is explained in greater detail below with reference to the embodiment examples indicated in the schematic figures of the drawings.

Therein.

DETAILED DESCRIPTION OF EXAMPLE EMBODIMENTS OF THE INVENTION

Figure 1:
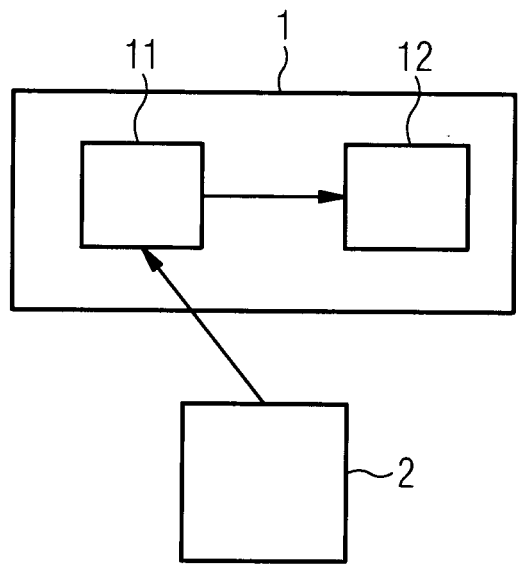
FIG. 1 shows a schematic block diagram of a device for detecting lanes according to an embodiment of the invention.

Further possible configurations, further developments and implementations of the invention also comprise combinations of features of the invention described above or below with respect to the embodiment examples, which are not explicitly indicated.

The appended drawings are intended to convey a further understanding of the embodiments of the invention. They illustrate embodiments and, in connection with the description, serve to explain the principles and concepts of the invention. Other embodiments and many of the indicated advantages are set out with respect to the drawings. The same reference numerals indicate the same or similarly acting components.

FIG. 1 shows a schematic block diagram of a device 1 for detecting lanes.

The device 1 comprises an interface 11 which is configured to receive and output data wirelessly or via a wired connection. In particular, the interface 11 receives camera data and transfers said data to a computing apparatus 12 of the device 1. The camera data comprise at least one camera image which has been generated by a camera device 2 of a vehicle. The camera image can also be combined from multiple individual images of a vehicle camera of the camera device 2 or from multiple images of a plurality of vehicle cameras of the camera device 2.

The computing apparatus 12 analyzes the camera image by means of image detection methods in order to extract feature points which correspond to regions having lane boundaries in the vehicle environment. The computing apparatus 12 comprises at least one microprocessor in order to perform the calculation steps.

The computing apparatus 12 generates a respective image portion around each of the feature points. This image portion serves as an input variable for a neural network which assesses the image portion. The neural network is preferably a convolutional neural network. A probability with which the image portion illustrates a lane boundary is calculated by means of the neural network. If the probability exceeds a predefined threshold, the computing apparatus 12 detects that the feature point of the image portion corresponds to a lane boundary.

The feature points classified in such away are further evaluated by the computing apparatus 12, in order to determine lanes in the environment of the vehicle. Thus, the computing apparatus 12 can determine the course of the lane boundaries in the camera image by interpolating feature points neighboring each other, which correspond to lane boundaries. The regions running between lane boundaries can be identified as lanes, and the computing apparatus 12 can generate an environment model.

Individual aspects of the device 1 are depicted more precisely below on the basis of FIGS. 2 to 4.

Figure 2:
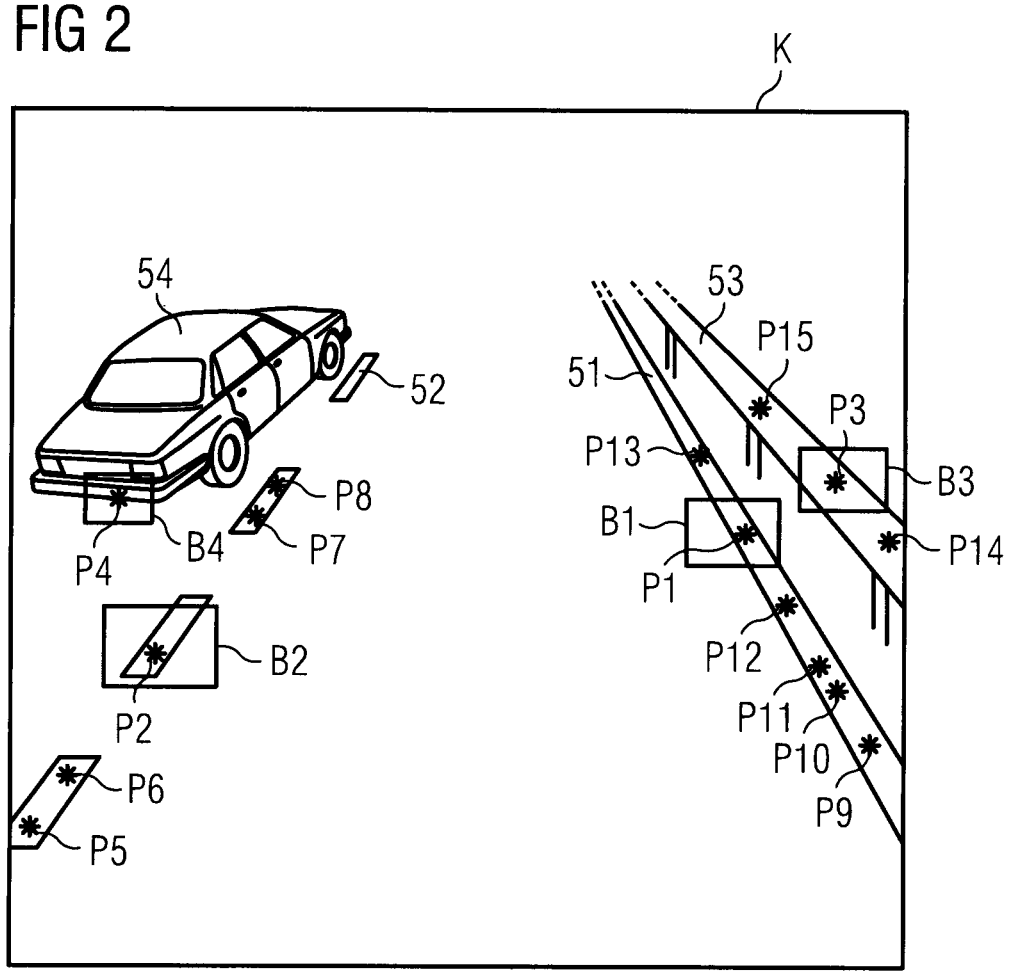
FIG. 2 shows a schematic camera image captured by a camera device.

Thus, FIG. 2 shows a camera image K captured by a camera device 2. The illustrated objects comprise a right lane marking 51, a middle lane marking 52, a guardrail 53 located at the edge of the right lane and a vehicle 54 driving on a parallel lane.

The computing apparatus 12 analyzes the pixels of the camera image K by means of traditional edge detection methods. In particular, the computing apparatus 12 can apply a Sobel filter to each pixel in order to detect an edge on or in the surroundings of the pixel. The Sobel filter can take account of 3×3 pixels in the surroundings of the pixel to be examined, but it can also allow for a larger surrounding region of the pixel.

The computing apparatus 12 can establish for each pixel whether the pixel is located at or in the proximity of an edge. In particular, the computing apparatus 12 can compare the value calculated by means of the Sobel filter with a predefined threshold. If the threshold is exceeded, the computing apparatus 12 establishes that the pixel is a feature point which corresponds to a possible lane boundary.

In the camera image K shown in FIG. 2, the computing apparatus 12 determines a total of 15 feature points P1 to P15. This is only to be understood by way of example. In general, a larger number of feature points is generated.

The computing apparatus 12 generates an image portion B1 to B3 for each feature point P1 to P15. For the sake of simplicity, only the image portions for the first three feature points P1 to P3 are marked in FIG. 2. The image portions B1 to B3 can have a predefined size of, for example, 128×128 pixels. The feature point P1 to P15 is, in each case, preferably arranged in the center of the respective image portion B1 to B3.

Figure 3:
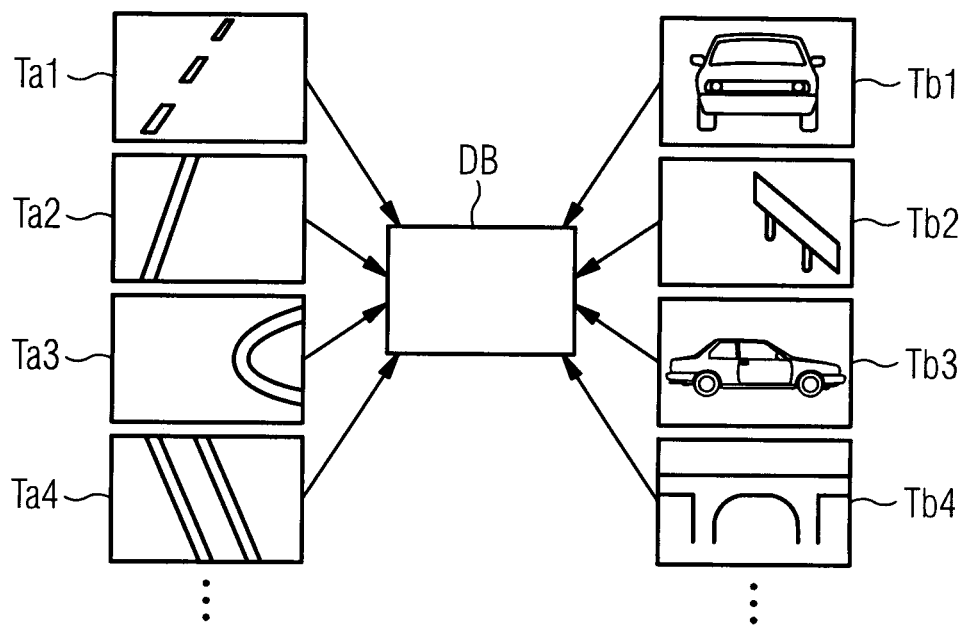
FIG. 3 shows illustrations as training data for a neural network.

The generation of the neural network used to further analyze the image portions B1 to B3 is explained in greater detail in FIG. 3. Accordingly, a database DB with training data is first produced. The training data comprise illustrations which have been captured by means of a vehicle camera. These are preferably manually classified into two groups. A first group Ta1 to Ta4 comprises illustrations which show lane boundaries. The illustrations can exclusively comprise images of lane markings. However, according to further embodiments, the illustrations can also illustrate curbsides or further lane boundaries. To this end, the illustrations can be produced with various brightnesses or weather conditions. The second group comprises illustrations Tb1 to Tb4 which show objects with edges which are not, however, lane boundaries. These can be illustrations of vehicles Tb1, Tb3, guardrails Tb2 or bridges Tb4.

The neural network is then trained in such a way that the illustrations of the first group Ta1 to Ta4 are classified as illustrations of lane boundaries, while the illustrations of the second group Tb1 to Tb4 are classified as illustrations which do not show lane boundaries. Following the training phase, the computing apparatus 12 can classify any image portions B1 to B3 by means of the neural network. To this end, a probability that the image portion B1 to B3 is an illustration of a lane boundary can first be output by means of the neural network. If the calculated probability exceeds a predefined threshold, for example 0.5, the computing apparatus 12 classifies the image portion B1 to B3 as corresponding to a lane boundary.

For the feature points P1 to P15 of the camera image K, the computing apparatus 12 detects, for example, that the feature points P2, P5 to P8 of the middle lane marking 52 and the feature points P1, P9 to P13 of the right lane marking 51 are feature points which correspond to lane boundaries. Conversely, the measuring points P4, P3, P14, P15 of the guardrail 53 and of the vehicle 54 are discarded as misidentifications since the illustrated objects are not lane boundaries.

In order to determine the lanes, the computing apparatus 12 preferably merely includes those feature points P1 to P15 which have been detected as corresponding to lane boundaries.

The computing apparatus 12 can then determine the corresponding lane boundaries by interpolating the neighboring remaining feature points P1 to P15 or pixels.

Figure 4:
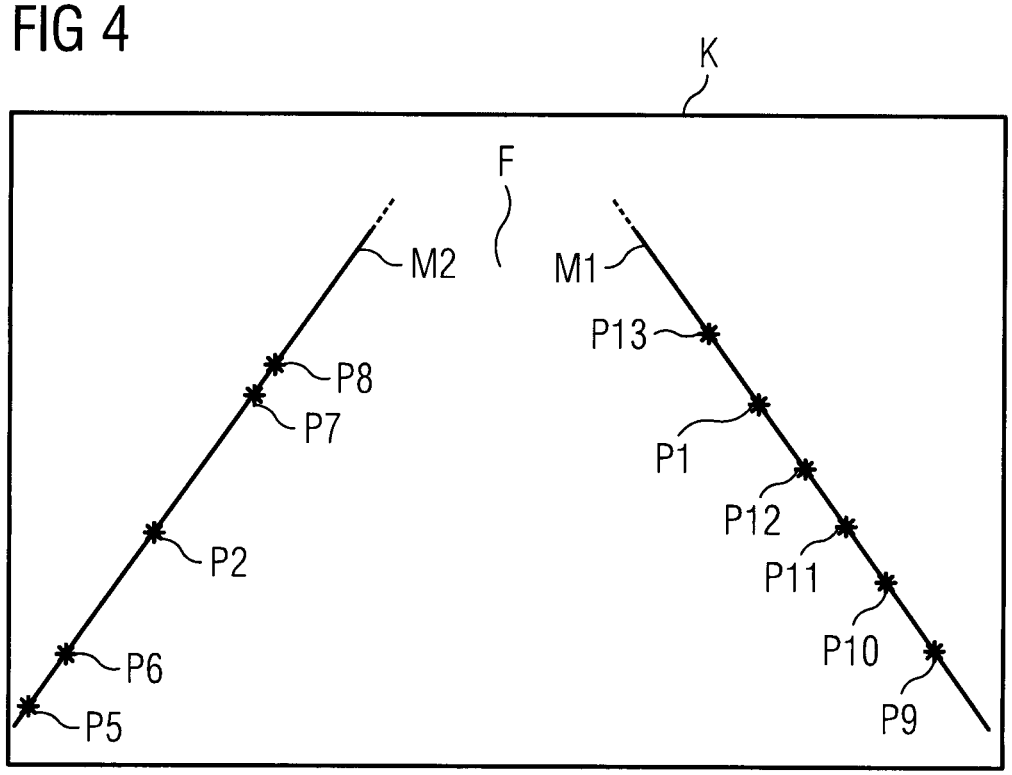
FIG. 4 shows lane boundaries detected in a camera image.

As shown in FIG. 4, the computing apparatus 12 detects, for example, a first lane boundary M1 and a second lane boundary M2 for the camera image K illustrated in FIG. 2. The computing apparatus 12 accordingly determines that a lane F runs between the lane boundaries M1, M2.

The described detection of the lanes is preferably performed iteratively, wherein the lane boundaries and lanes already detected are updated.

Figure 5:
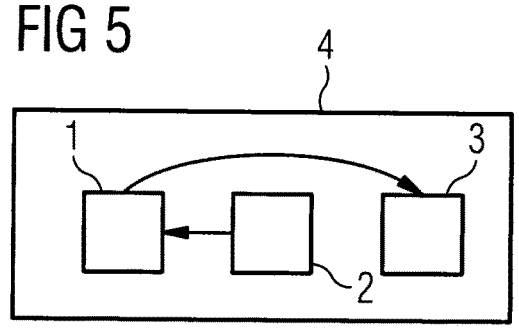
FIG. 5 shows a schematic block diagram of a driver assistance system.

A block diagram of a driver assistance system 4 for a vehicle according to an embodiment of the invention is depicted in FIG. 5. The driver assistance system 4 comprises a camera device 2 which has one or a plurality of vehicle cameras which are arranged or arrangeable on the vehicle.

The driver assistance system 4 additionally comprises a device 1 for detecting lanes, which is described above. The device comprises an interface 12 which is described above and which receives the camera images captured by the camera device 2, as well as a computing apparatus 12 which determines lanes F on the basis of the camera images.

The driver assistance system 4 can comprise a control device 3 which can control specific driving functions of the vehicle. Thus, the control device 3 can control the vehicle as a function of the detected lanes in such a way that the vehicle is accelerated, braked or steered. The driver assistance system 4 can, as a result, make possible a semi-autonomous or autonomous control of the vehicle. The control device 3 can additionally be configured to output a warning signal if the vehicle leaves the detected lane F in order to warn the driver against an unintentional departure from the lane F.

Figure 6:
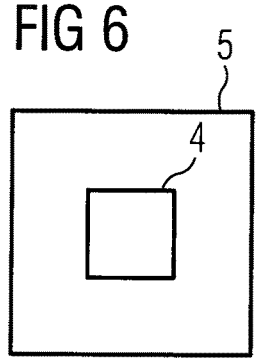
FIG. 6 shows a schematic block diagram of a vehicle.

A block diagram of a vehicle 5 according to an embodiment of the invention is depicted in FIG. 6. The vehicle 5 can, for instance, be a car, a truck or a motorcycle. The vehicle 5 comprises a driver assistance system 4, which is described above, comprising a device 1 for detecting lanes F in the surroundings of the vehicle 5.

Figure 7:
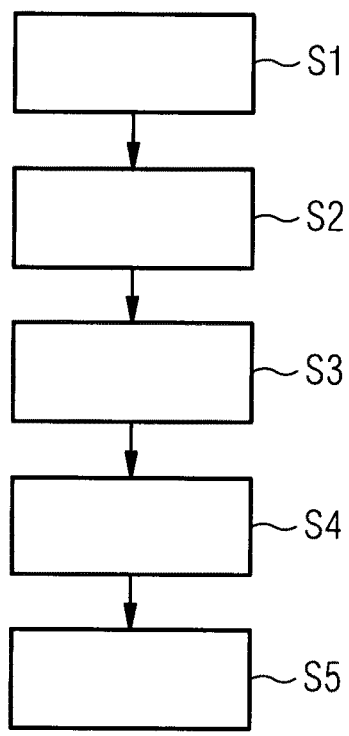
FIG. 7 shows a flow chart of a method for detecting lanes.

FIG. 7 shows a flow chart of a method for detecting lanes F according to an embodiment of the invention.

In a method step S1, a camera image of a vehicle environment is captured by means of a camera device 2. To this end, multiple individual images can also be combined.

In the further method step S2, the individual pixels of the camera image are evaluated by means of an edge detection method, in order to determine feature points P1 to P15. To this end, Sobel filters can for example be used in order to detect edges. If the values calculated by means of the Sobel filter exceed a predefined threshold, the pixels are identified as feature points P1 to P15 which can correspond to lane boundaries.

An image portion B1 to B3 is generated around each feature point P1 to P15 in a method step S3. The feature point P1 to P15 can preferably be located in a center of a square image portion B1 to B3. The size of the image portion can, for example, be 128×128 pixels. However, the invention is not restricted to this. Thus, the image portion does not necessarily have to have a square or rectangular configuration. The form of the image portion can be selected, for example, as a function of the perspective representation of the camera device 2.

In a method step S4, the image portions are analyzed using a neural network. To this end, the neural network is produced or taught on the basis of training data from a database. The training data comprise the illustrations of lane boundaries or of lane surroundings without lane boundaries described in connection with FIG. 3. Following the training phase, the neural network is configured to analyze and classify any image portions. It is detected for each image portion whether the illustrated region of the vehicle environment illustrates a lane boundary or not. The feature points are classified accordingly. Those feature points which are classified accordingly as a lane boundary by means of the neural network are further evaluated, while the remaining feature points are discarded.

On the basis of the remaining feature points, the courses of lane boundaries M1, M2 are determined in a method step S5. On the basis of the courses of the lane boundaries M1, M2, lanes F which are usable by the vehicle 5 are detected.

On the basis of the detected lanes F, warning signals can additionally be output or a semi-autonomous or autonomous control of the vehicle 5 can be performed.

REFERENCE NUMERALS

1 Device for detecting lanes
2 Camera device
3 Control device
4 Driver assistance system
5 Vehicle
11 Interface
12 Computing apparatus
51 Right lane marking
52 Middle lane marking
53 Guardrail
54 Vehicle
F Lane
M1, M2 Lane boundaries
P1 to P15 Feature points
B1 to B3 Image portions
Ta1 to Ta4 Illustrations of lane boundaries
Tb1 to Tb4 Illustrations of objects which are not lane boundaries

The invention claimed is:

1. A method of detecting a lane on a roadway, comprising the steps:
with a camera of a vehicle, capturing a camera image of a vehicle environment including a roadway on which the vehicle is driving;
determining feature points in the camera image by analyzing the camera image with image processing that does not use a neural network, wherein the feature points correspond to points on possible lane boundaries of at least one lane on the roadway;
selecting a respective image portion of the camera image having a respective predefined size around each respective one of the feature points;
analyzing the image portions using a neural network to classify the feature points thereof regarding whether or not the feature points represent actual lane boundaries; and
determining the at least one lane on the roadway in the vehicle environment based on the feature points that have been classified as representing the actual lane boundaries.

2. The method according to claim 1, further comprising operating a driver assistance system of the vehicle in response to and dependent on the at least one lane that has been determined, to autonomously or semi-autonomously control a driving operation of the vehicle with respect to guidance thereof relative to a respective lane of the at least one lane that has been determined.

3. The method according to claim 1, further comprising operating a driver assistance system of the vehicle in response to and dependent on the at least one lane that has been determined, to output a warning signal to a driver of the vehicle when the vehicle leaves a respective lane of the at least one lane that has been determined.

4. The method according to claim 1, wherein the respective predefined size of the respective image portion is defined based on a predefined total number of pixels of the respective image portion, predefined pixel dimensions of the respective image portion, or a predefined physical size of the respective image portion.

5. The method according to claim 1, wherein the feature points are respective feature point pixels in the camera image, and the selecting of the respective image portion comprises defining the respective image portion having the predefined size around a respective one of the feature point pixels so that the respective feature point pixel is located within the respective image portion.

6. The method according to claim 1, wherein the feature points are respective feature point pixels in the camera image, and the selecting of the respective image portion comprises defining the respective image portion having the predefined size around a respective one of the feature point pixels so that the respective feature point pixel is located at a center of the respective image portion.

7. The method according to claim 1, wherein the image processing for the determining of the feature points uses edge detection algorithms.

8. The method according to claim 7, wherein the edge detection algorithms use Sobel filters.

9. The method according to claim 1, wherein the possible lane boundaries comprise lane markings.

10. The method according to claim 1, wherein the neural network is a convolutional neural network.

11. The method according to claim 1, further comprising teaching the neural network using predefined training data from a database.

12. The method according to claim 11, wherein the training data comprise illustrations of example lane boundaries and illustrations of example non-boundary structures that do not constitute lane boundaries.

13. The method according to claim 12, wherein the illustrations have been generated at least partially with different brightnesses and/or different times of day and/or different weather conditions.

14. The method according to claim 1, further comprising determining courses of the actual lane boundaries by interpolating between neighboring ones of the feature points that have been classified as representing the actual lane boundaries, and wherein the determining of the at least one lane is further based on the courses of the actual lane boundaries.

15. A device for detecting a lane on a roadway, comprising:
- an interface configured to receive, from a camera device of a vehicle, a camera image of a vehicle environment including a roadway on which the vehicle is driving; and
- a computing apparatus which is configured:
  - to determine feature points in the camera image by analyzing the camera image with image processing that does not use a neural network, wherein the feature points correspond to points on possible lane boundaries of at least one lane on the roadway;
  - to select a respective image portion of the camera image having a respective predefined size around each respective one of the feature points;
  - to analyze the image portions using a neural network to classify the feature points thereof regarding whether or not the feature points represent actual lane boundaries; and
  - to determine the at least one lane on the roadway in the vehicle environment based on the feature points that have been classified as representing the actual lane boundaries.

16. The device according to claim 15, wherein the computing apparatus is configured to perform the image processing for determining the feature points by using edge detection algorithms.

17. The device according to claim 16, wherein the computing apparatus is configured to use Sobel filters for the edge detection algorighms.

18. The device according to claim 15, wherein the computing apparatus is further configured to determine courses of the actual lane boundaries by interpolating between neighboring ones of the feature points that have been classified as representing the actual lane boundaries, and to determine the at least one lane further based on the courses of the actual lane boundaries.

19. A driver assistance system for a vehicle, comprising:
- a device for detecting a lane on a roadway according to claim 15, and
- the camera device configured to capture the camera image of the vehicle environment of the vehicle.

20. A vehicle comprising the driver assistance system according to claim 19 and a vehicle body.

* * * * *